(No Model.) 3 Sheets—Sheet 1.
S. B. SHANK.
COMBINED HAY RAKE AND TEDDER.
No. 396,002. Patented Jan. 8, 1889.
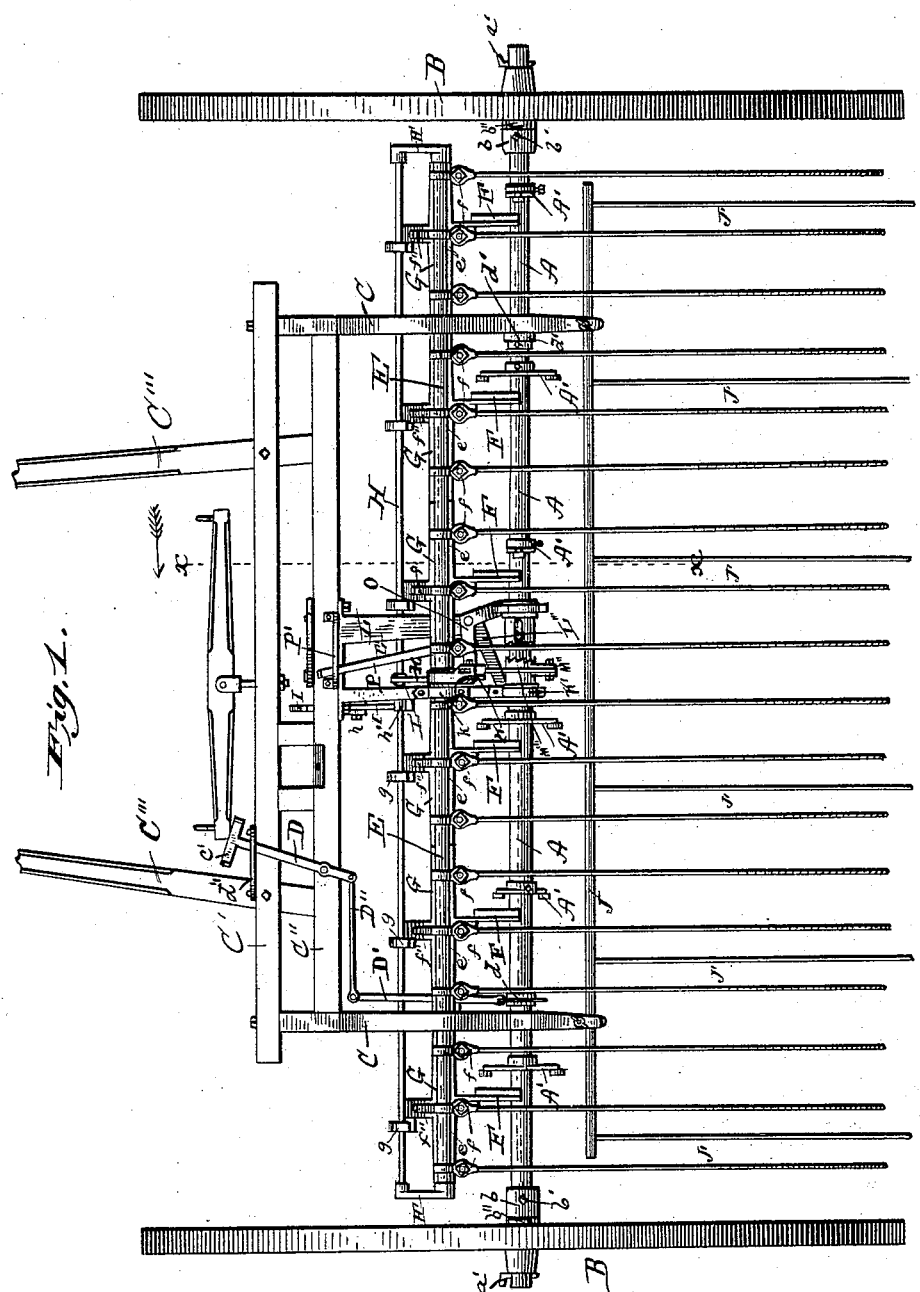
WITNESSES
INVENTOR.
Attorney.

(No Model.) 3 Sheets—Sheet 2.
S. B. SHANK.
COMBINED HAY RAKE AND TEDDER.
No. 396,002. Patented Jan. 8, 1889.
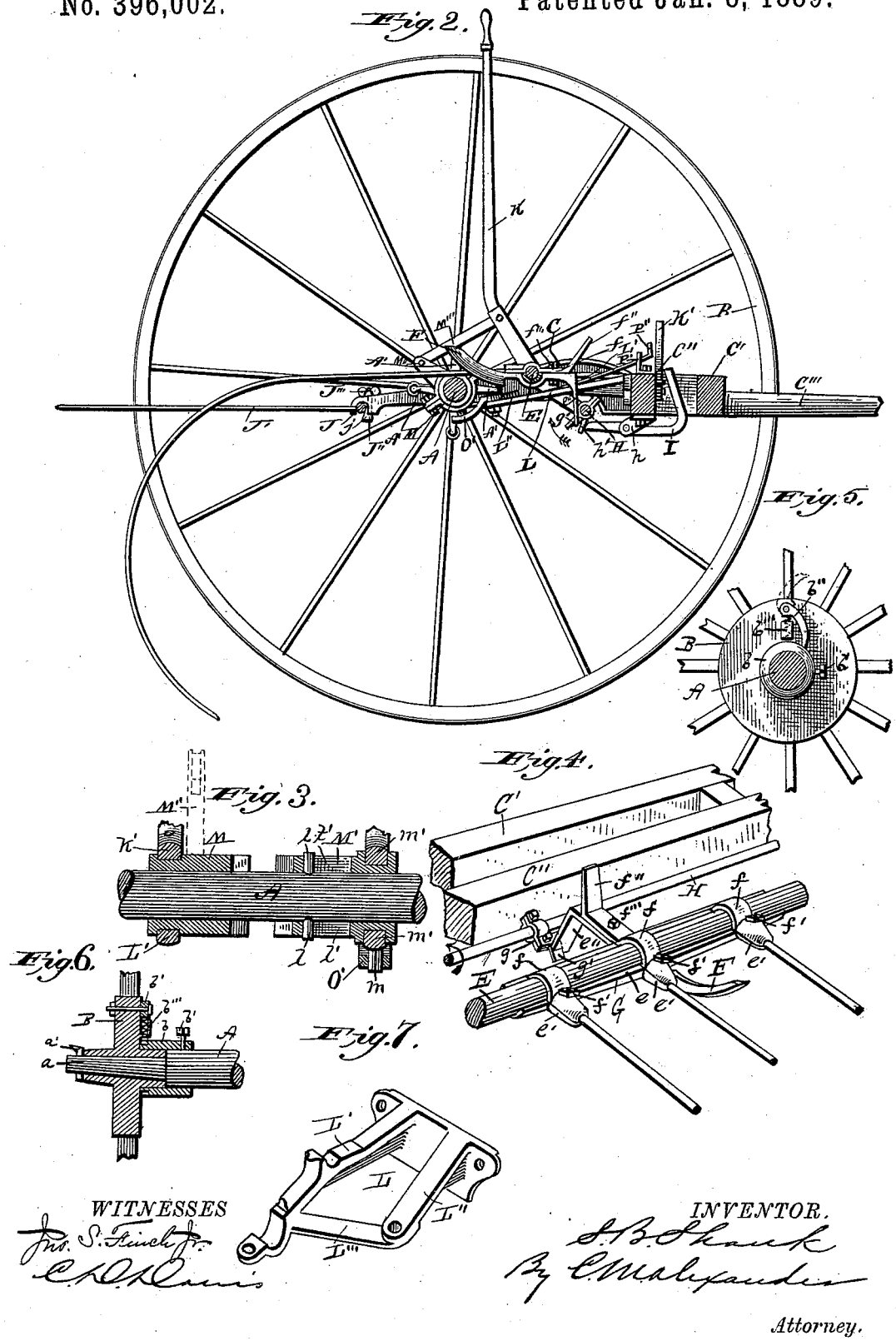
WITNESSES
INVENTOR.

(No Model.) 3 Sheets—Sheet 3.
S. B. SHANK.
COMBINED HAY RAKE AND TEDDER.
No. 396,002. Patented Jan. 8, 1889.
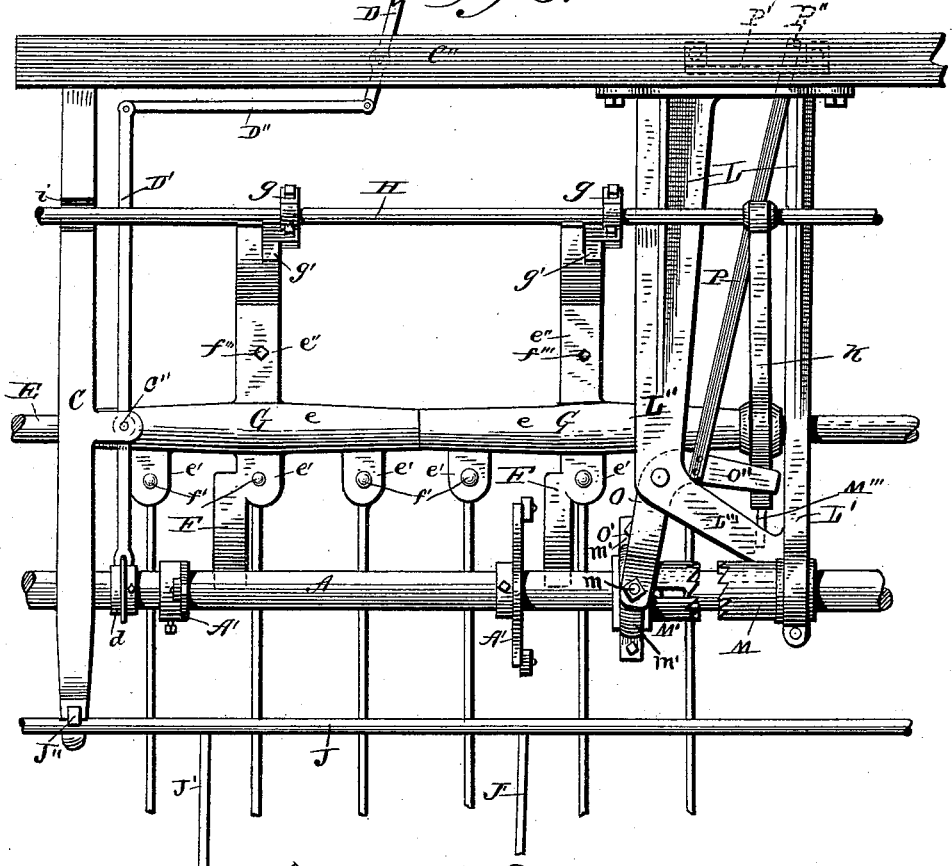
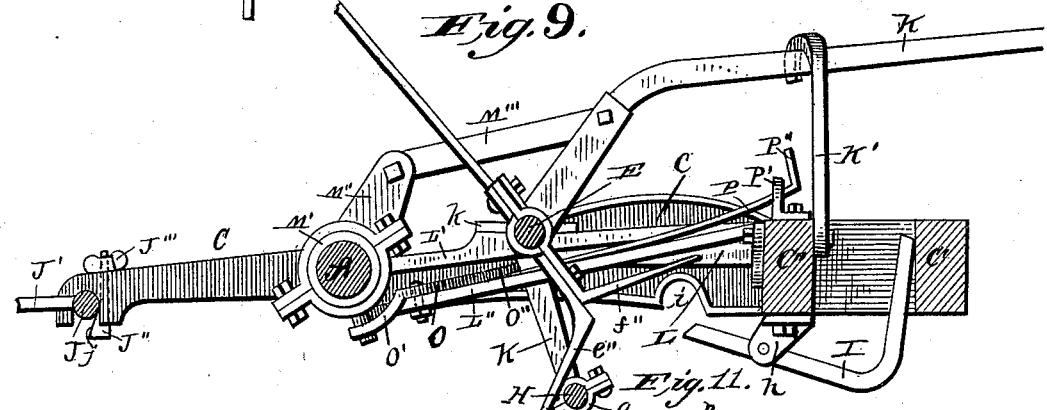
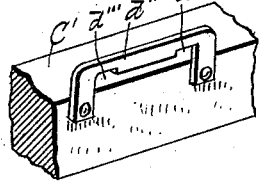
WITNESSES
INVENTOR,
S. B. Shank
By C. M. Alexander
Attorney.

UNITED STATES PATENT OFFICE.

SAMUEL B. SHANK, OF MILLERSVILLE, ASSIGNOR TO ISRAEL L. LANDIS, OF LANCASTER, PENNSYLVANIA.

COMBINED HAY RAKE AND TEDDER.

SPECIFICATION forming part of Letters Patent No. 396,002, dated January 8, 1889.

Application filed June 21, 1888. Serial No. 277,791. (No model.)

*To all whom it may concern:*

Be it known that I, SAMUEL B. SHANK, a citizen of the United States, residing at Millersville, in the county of Lancaster and State of Pennsylvania, have invented certain new and useful Improvements in a Combined Hay Rake and Tedder, of which the following is a specification, reference being had therein to the accompanying drawings, in which—

Figure 1 represents a plan view of my improved combined hay rake and tedder complete; Fig. 2, a transverse sectional view on the line $x\,x$, looking in the direction of the arrow, the machine being adjusted to operate as a rake with the rake-teeth down; Fig. 3, a detail longitudinal sectional view of the clutch mechanism upon the axle; Fig. 4, a detail perspective view of portions of the frame and rake-shaft, showing clearly the means employed for pressing the rake-teeth down to their work; Fig. 5, a detail side view of hub of driving-wheel; Fig. 6, a detail sectional view of same; Fig. 7, a detail perspective view of a casting or bracket bolted to the rear side of the rear beam of the frame; Fig. 8, an enlarged bottom view of a portion of the machine, showing more clearly the means for operating the clutch devices, the means for shifting the frame of the machine, and the bracket shown in Fig. 7; Fig. 9, a similar view to that shown in Fig. 2, the parts being somewhat enlarged, the transporting-wheels being removed, and the rake-teeth being elevated; Fig. 10, a perspective view of the lever-retaining loop $d''$ shown in plan in Fig. 1, and Fig. 11 a similar view of the loop P'.

This invention relates particularly to certain new and useful improvements upon that class of machines covered by Patent No. 374,795, granted to I. L. Landis, Albert Iske, and A. Iske upon the 13th day of December, 1887, wherein the tappets for operating the rake-sections in teddering are located upon the axle of the machine, and the frame of the machine, which carries the rake-shaft and its rake-sections, is supported upon the axle and has a limited lateral movement thereon, the said frame being shifted upon the axle whenever it is desired to change the machine from a rake to a tedder, and vice versa, as will be more fully hereinafter set forth.

The object of the invention is to improve and simplify the construction generally of combined hay rakes and tedders; to provide simple and efficient means for holding the rake-teeth down to their work whenever desired; to provide convenient means for shifting the frame upon the axle to change from a rake to a tedder, or vice versa, and to provide simple and convenient mechanism for automatically elevating the rake-teeth to release the gathered hay, the rotation of the axle being utilized for this purpose, as will presently appear.

The invention has also other minor objects in view, which will appear in the course of this specification.

Referring to the annexed drawings by letter, A designates the axle of the machine, and B B the driving or transporting wheels, journaled loosely on the spindles $a$, the wheels being held upon the spindles by the thole-pins $a'$. Secured adjustably to the axle by set-screws $b'$ and extending over the joints between the inner ends of the hubs and the shoulders formed by the spindles are sleeves $b$, the peripheries of which, at their outer ends, are serrated or notched, as clearly shown in Fig. 6.

Pivoted to the inner faces of the hub and adapted to engage the notches in the outer ends of the said sleeves are pawls $b''$, these pawls being held in engagement with the said serrations by coil-springs, which bear up against flattened portions of the pawls directly under their pivot-pins, these coil-springs having their lower ends set in retaining-sockets $b'''$, formed on or attached to the inner faces of the hubs. It will be observed that by this construction of pawls they may readily be held out of engagement with the ratcheted sleeves by simply turning them up, as shown in dotted lines in Fig. 5. The sleeves $b$ will prevent dust and sand from working its way in between the hub and axle, serving as a sand-band. These ratchet-and-pawl devices may be placed on one or both wheels, as may be desired. As constructed, it will be observed they permit the machine to be backed without revolving the axle.

At intervals along the axle two armed tappets, A', are secured, each arm of the tappets being preferably provided with an anti-friction roller, which impinges against the cams upon the rake-sections to be hereinafter mentioned.

The frame of the machine consists in this instance, essentially, of two parallel beams, C' C'', (to which are connected the shafts or thills C''',) and the metallic end beams, C, which are bolted to the said beams C' C'' and project rearwardly therefrom a short distance back of the axle. This frame is mounted loosely upon the axle and is longitudinally movable thereon, the axle being loosely journaled in the end beams, C. The frame is shifted on the axle by means of two levers, D D', connected together by a link, D'', the former lever being pivoted to the beam C'' and provided with a foot-stirrup, c', at its forward end, and the latter, D', being pivoted to an ear or projection, c'', formed on the under side of the end beam, C, and having its rear end engaging a flanged collar, d, secured on the axle. The foot-lever D is preferably slightly elastic or springy and has its forward end confined in a loop, d'', secured upon the beam C', this loop being notched at d''' for the reception and retention of the lever. The lever presses normally upward and catches in the notches d''' automatically as the lever is moved by the foot of the driver from one end of the loop to the other, thus locking the machine in either of its adjusted positions.

When the driver desires to change the machine from a rake, as shown in Fig. 1, all he does is to place his foot in the stirrup c' and push the lever D over to the left of the loop, when it automatically locks itself in one of the notches d'''. The frame of the machine is by this movement, through the medium of the lever D' and link D'', moved upon the axle far enough in the opposite direction for the cams upon the rake-sections to come directly over and in line with the tappets A', the collars d and d' serving to limit the longitudinal movement of the frame. In changing the machine from a tedder to a rake the operation is reversed, as is evident.

Mounted in the end beams, C, of the frame, in front of the axle and running parallel with the same, is the rake-shaft, E, and loosely mounted upon this rake-shaft are the oscillating rake-sections. These rake-sections are independent of each other, so as to readily accommodate themselves to the contour of the ground, and they each consist of a rake-head, G, provided with the usual rearwardly-extending curved rake-teeth, and a rearwardly-projecting and upwardly-curved cam, F, against which latter the tappets A' strike while teddering. As shown clearly in Fig. 4, these rake-heads each consist of a long semi-tubular portion, e, which loosely embraces the under half of the rake-shaft and is provided with three rearwardly-projecting arms or lugs, e', and a single central forwardly-projecting arm, e'', this arm being inclined downwardly and forwardly. This semi-tubular portion e is held up against the axle by means of the cap pieces or plates f, which are curved to embrace the axle, and are bolted to the said portion e by means of vertical bolts f', passed through the said plates f and the rearwardly-projecting arms e', the rake-teeth being also held in place by these plates f and bolts f''. The central cap-piece, f, is extended forwardly and turned up at f''', and a bolt, f''', is employed to clamp the said cap-piece and the arm e'' together.

Journaled in forwardly-projecting arms H', secured rigidly to the ends of the rake-shaft, is a rock-shaft, H, which is provided at intervals with adjustable clips g, rigidly clamped by means of bolts to the said rock-shaft, and provided with rearwardly-inclined lips g', these lips being adapted to fit in offsets or notches cut in the ends of the arms e'', as shown in Fig. 4. These adjustable clips g upon the rock-shaft H are constructed, preferably, of two parts, and are removably clamped to the shaft at the proper points along its length by means of bolts. By thus removably clamping these clips upon the shaft they may not only be readily adjusted along the shaft to fit the lips g' into the notched ends of the arms e'', but they may also be adjusted rotatively to bear with proper force upon the ends of the said arms. When the rake-teeth wear off at the ends or become bent, these clips may be adjusted independently of each other to compensate for such wear. Should any one of the clips become broken or lost, it may be readily replaced by a new one in the field without disturbing the rock-shaft H. This shaft H is rocked in its bearings by means of the knee-lever I, pivoted in ears h, bolted to the bottom of the beam C'', the vertical arm of this lever extending up between the beams C' and C'', so that the driver may operate it conveniently by simply pressing down upon it with his foot. The rear end of this lever I is preferably beveled and (while the rake-teeth are down) rests normally against a forwardly-inclined plate, h', secured upon the rock-shaft H. When pressure is exerted upon the knee-lever I, the rock-shaft will be rocked through the medium of the inclined plate h' in the direction indicated by the arrow in Fig. 2, the lips g' of the clips g being forced up against the notched end of the downwardly-projecting arm e'', and by that means forcing all the rake-teeth down closely and steadily to their work.

The letter K designates a lever for elevating the rake-teeth to release the raked hay, this lever being pivoted upon the rake-shaft and attached at its lower end to the shaft H. By moving this lever in a forward direction, the shaft H, being attached to the lower end of the lever, will move rearwardly and downwardly, and the clips g upon the same will impinge against the downward extensions of the arms e'' of the rake-heads and carry them with it, thus elevating the rake-teeth. The extensions f'' of the central cap-plates, f, of the rake-heads, by striking against the shaft H, will prevent the rake-sections from turning over, while at the same time they will not prevent the free oscillation of the rake-sections during the teddering operation. To hold the rake-teeth in an elevated position, a hook, K', is pivoted to the beam C'', this hook being hooked over the lever K when it is brought down by the driver.

A semicircular notch or recess, $i$, is formed in the under sides of the end beams, C C, for the reception of the shaft H while the same is in its normal position. Secured removably and adjustably in notches formed in the under sides of the end beams at their rear ends is the clearer-shaft J, provided with the usual clearing-tines, J'. This shaft J is held up in its notches by means of a bolt, J'', passing up vertically through the beams C and provided with a thumb-nut, J'''. This bolt J'' is provided with a beveled head, $j$, the beveled or inclined surface of which bears against the shaft J and serves to hold it to its place, as most clearly shown in Fig. 9.

Besides the lever K, I provide another means of dumping or releasing the raked hay from the rake-teeth. In this method of dumping the hay I utilize the rotation of the axle to raise the rake-teeth, all the driver having to do to dump the hay being to move with his foot a lever within convenient reach of him. I will now describe these devices for dumping the raked hay.

Bolted to the rear side of the beam C'' and projecting rearwardly therefrom is a cast bracket, L, consisting, preferably, of two arms, L' L'', the former being somewhat the longer and connected to the latter by an integral brace, L''', as shown most clearly in Fig. 7. The arm L' of the bracket has journaled in it the rake-shaft E, the same being clamped thereto by means of a cap-plate, $k$, bolted to the arm. Journaled in the outer end of the arm L' and held therein by means of a cap-plate, $k'$, bolted to the said arm, is a clutch-sleeve, M, the said arm and cap-plate fitting in an annular groove in the sleeve. The axle A passes loosely through this clutch-sleeve M, and the sleeve is provided with an upwardly-extending arm, M'', pivotally connected to lever K by means of a link, M'''. Mounted loosely upon the axle in close proximity to the clutch-sleeve M is a similar sleeve, M', which turns with the axle, but has a longitudinal movement thereon, this being accomplished by means of the pins $l\ l$, secured in the axle and working in slots $l'\ l'$ in the sleeve. The adjacent ends of the sleeves M M' are serrated, like the ordinary clutch, so that when the continuously-rotating movable sleeve M' is moved toward the stationary sleeve it will engage with the same and carry it around as the axle revolves.

To throw the movable clutch M' into engagement with the stationary clutch, I provide an angle-lever, O, pivoted upon the upper side of the bracket L and consisting of two arms, O' O'', the former engaging a pin or stud, $m$, formed on the under side of the lower one of two plates, $m'\ m'$, clamped loosely in an annular groove in the periphery of the said movable clutch M'. Secured rigidly to the arm O'' of the pivoted angle-lever O is a lever, P, which extends forward to within convenient reach of the driver and has its forward end confined in a loop, P', bolted to the beam C''. This lever is slightly elastic, and its normal tendency is to spring upward, and it is provided with a foot-piece, P'', by which it is moved from one end of the confining-loop to the other. The loop is provided with a notch at $p$, (shown in Fig. 11,) with which the lever engages to hold the movable clutch M' out of engagement with the clutch M.

The operation of this dumping mechanism is as follows: When the driver desires to release the raked hay, he moves the lever P to the right of the retaining-loop P' with his foot. This movement, through the medium of the angle-lever O, throws the movable clutch M' into engagement with the stationary clutch M. As the axle is revolved by the forward motion of the machine, the clutch M is carried around a certain distance with it, when it is released automatically by the lower portion of the lever K coming in contact with the free arm O'' of the pivoted angle-lever O, which disengages the movable clutch M'. The lever K is carried forward and the rake-teeth elevated by means of the upwardly-extending arm M'' on the stationary clutch and the connecting-link M''', the lever and rake sections being allowed to drop back into their normal positions when the movable clutch is disengaged in the manner above described.

Having thus fully described my invention, what I claim as new, and desire to secure by Letters Patent, is—

1. The combination, with the axle provided with a spindle, of a wheel journaled upon the said spindle, a sleeve, $b$, secured upon the axle and extending over the joint between the inner end of the hub of the wheel and the shoulder of the axle, this sleeve being serrated or notched on its periphery at or near its outer end, and a spring-actuated pawl pivoted upon the inner face of the hub and normally engaging the said ratcheted sleeve, substantially as herein set forth.

2. The combination, with an axle provided with transporting-wheels, tappets secured upon the axle, and stop-collars $d\ d'$, secured upon the axle, the former collar being flanged, of a movable frame mounted upon the axle and limited in its movements by the said stop-collars, a rake-shaft mounted in the frame and movable with it, independent oscillating rake-sections pivoted upon the rake-shaft and provided with cams, the lever D', pivoted upon the frame and engaging the stationary stop-collar $d$, connecting-link D'', a spring-lever, D, pivoted upon the frame of the machine and provided with a foot-piece, and a notched retaining-loop, $d''$, bolted to the frame, all arranged as and for the purpose set forth.

3. The combination of the axle provided with transporting-wheels, a frame mounted upon the axle, a rake-shaft mounted upon the frame, rake-tooth sections pivoted upon this shaft, these rake-sections being provided with forwardly and downwardly extending arms $e''$, a rock-shaft, H, parallel to the rake-shaft and journaled in arms upon the ends of the rake-shaft, adjustable clips $g$, secured upon the said rock-shaft, these clips being provided with rearwardly and downwardly inclined lips $g'$ to engage the arms $e''$, and means, substantially as described, for rocking the shaft H, as herein described.

4. The combination, with an axle mounted on wheels, a frame upon the axle, a rake-shaft journaled in the frame, rake-sections pivoted on the rake-shaft, and a dumping-lever, K, mounted on the rake-shaft, a portion of this lever extending below the rake-shaft, of a stationary bracket secured to the frame, a stationary clutch-sleeve, M, on the axle, a sliding clutch-sleeve on the axle adapted to engage the stationary clutch-sleeve, an angle-lever, O, pivoted upon the said stationary bracket and connected to the sliding clutch-sleeve, an operating-lever, P, attached to this angle-lever O, a rigid arm, $M''$, on the said stationary sleeve, and a link, $M'''$, pivotally connecting this rigid arm with the said dumping-handle K, all arranged to operate substantially as herein set forth.

5. The combination of an axle provided with transporting-wheels, a frame, a rake-shaft mounted in the frame, independent rake-sections pivoted on this rake-shaft, each of these rake-sections being provided with forwardly and downwardly projecting arms $e''$, a rock-shaft parallel with and in front of the shaft and journaled in arms $H'$, secured on the same, adjustable clips $g$, secured on the rock-shaft and provided with rearwardly and downwardly projecting lips $g'$, these lips being adapted to bear upwardly upon the said arms $e''$ on the rake-sections, a forwardly and downwardly inclined lip, $h'$, secured rigidly on the rock-shaft, and a knee-lever, I, pivoted on the frame, the rear end of this lever being adapted to bear upon the said inclined lip $h'$ on the rock-shaft, substantially as and for the purpose set forth.

6. The combination of an axle provided with wheels, a frame, a rake-shaft, rake-sections mounted on this shaft and provided with forwardly and downwardly projecting arms $e''$ and upwardly-projecting arms $f''$, a rock-shaft, H, journaled in rigid arms on the rake-shaft and arranged parallel therewith, clips $g$, secured on the rock-shaft and provided with rearwardly-extending lips $g'$, adapted to bear upon the said arms $e''$, and means for rocking the rock-shaft, substantially as described.

In testimony whereof I affix my signature in presence of two witnesses.

SAMUEL B. SHANK.

Witnesses:
DANIEL LINTNER,
JOHN M. WARM.